United States Patent Office 3,654,334
Patented Apr. 4, 1972

3,654,334
PREPARATION OF ORGANIC THIOCYANATES AND SULFONATES FROM SULFONYL HALIDES OR CYANIDES
Richard Garth Pews, Fred P. Corson, and Edwin B. Nyquist, Midland, Mich., assignors to The Dow Chemical Company, Midland, Mich.
No Drawing. Filed Aug. 4, 1969, Ser. No. 847,397
Int. Cl. C07c 161/02
U.S. Cl. 260—454          7 Claims

ABSTRACT OF THE DISCLOSURE

Organic thiocyanates are prepared by reacting the appropriate sulfonyl halide or sulfonyl cyanide in the liquid phase with a cyanide salt under essentially anhydrous reaction conditions to obtain the corresponding thiocyanate and sulfonate.

BACKGROUND OF THE INVENTION

Van Leusen et al. in Chemical Communications, 1968, 440, reported that sulfonyl cyanides cannot be prepared by reacting sulfonyl halides with cuprous, silver or lithium cyanides. The reaction conditions and products of the reactions, however, are not disclosed.

Loew in Zeitschr. Chem. 1868, 518, shows the reaction of trichloromethyl sulfonyl chloride in an aqueous solution of potassium cyanide produces cyanogen chloride and potassium trichloromethylsulfinate. No sulfonate or thiocyanate was reported.

SUMMARY OF THE INVENTION

According to the present invention, organic sulfonyl halides and sulfonyl cyanides are reacted in the liquid phase with a cyanide salt under anhydrous reaction conditions to produce the corresponding organic thiocyanates and sulfonates.

In a preferred process of the present invention, a sulfonyl halide or sulfonyl cyanide is contacted with excess cyanide salt in a suitable solvent without a catalyst for a number of hours. The reaction mixture is filtered to give a solid residue which is extracted with methanol. The methanol extract is evaporated to give the corresponding sulfonate. The filtrate of the reaction mixture is concentrated until a precipitate forms on cooling and the cooled concentrate is filtered. The residue is extracted with benzene and the corresponding thiocyanate is isolated by evaporating the benzene. The reaction occurs essentially according to the general formula:

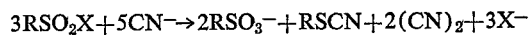

$3RSO_2X + 5CN^- \rightarrow 2RSO_3^- + RSCN + 2(CN)_2 + 3X^-$ where X=CN or halogen.

The organic sulfonyl halides and sulfonyl cyanides suitable for use in the present invention include essentially any aliphatic, aromatic or heterocyclic sulfonyl compound, with those sulfonyl compounds containing up to about 20 or more carbon atoms being preferred. Representative examples of such sulfonyl halides and sulfonyl cyanides include: aliphatic hydrocarbon sulfonyl compounds such as ethanesulfonyl cyanide, n-butanesulfonyl chloride, methanesulfonyl bromide, hexanesulfonyl fluoride, 3-octenesulfonyl chloride and decanesulfonyl bromide; substituted aliphatic sulfonyl compounds such as 2-nitrobutanesulfonyl chloride, 3 - chlorohexanesulfonyl bromide, 2-hydroxy-1-ethanesulfonyl cyanide and 2,2-dibromohexanesulfonyl fluoride; hydrocarbon aromatic sulfonyl compounds such as p-toluenesulfonyl chloride, p-toluenesulfonyl bromide, p-toluenesulfonyl fluoride, p-toluenesulfonyl cyanide, o-ethylbenzenesulfonyl fluoride and naphthalenesulfonyl chloride; substituted aromatic sulfonyl compounds such as m-nitrobenzenesulfonyl chloride, p-phenolsulfonyl fluoride, p-chlorobenzenesulfonyl bromide, and p-chlorobenzenesulfonyl cyanide; and heterocyclic sulfonyl compounds such as pyridinesulfonyl chloride; furansulfonyl bromide and thiophenesulfonyl cyanide. Of these sulfonyl compounds, the hydrocarbon benzenesulfonyl halides and cyanides containing up to about 10 or more carbon atoms are preferred, with the p-alkylbenzenesulfonyl compounds being especially preferred.

The sulfonyl halides of the present invention are well known and readily available. The sulfonyl cyanides are also known and may be prepared by reacting the appropriate sodium sulfinate with cyanogen chloride.

The cyanide salts of the present invention may suitably be any cyanide salt that dissociates readily in the reaction medium. The cation of such salts is not critical, but alkali metal cyanides are preferred.

The comparative concentrations of the two reactants may vary widely. Assuming that the general formula given above is correct, 3 moles of the organic sulfonyl compound react with 5 moles of cyanide in a stoichiometric reaction. Although the reactants may be reacted in the stoichiometric proportions, an excess of cyanide is generally used, with a 30 to 100% stoichiometric excess of cyanide being preferred.

The reaction is usually conducted in the presence of an inert solvent which at least partially dissolves the cyanide and the organic sulfonyl halide or sulfonyl cyanide. Representative examples of suitable solvents include the lower hydrocarbon nitriles, anhydrous ethers and halogenated hydrocarbons.

It is important that the reaction be run under essentially anhydrous conditions to prevent hydrolysis of the sulfonyl halide or sulfonyl cyanide. If water is present in the reaction, lower yields are obtained.

The temperature of the reaction may vary widely as different reactants and solvents are employed in the reaction. Generally the temperature may range from about 0° to about 200° C. or more. Within this range of reaction temperatures, the time of reaction may range from about 5 to about 30 hours or more. The reaction time, however, varies as different organic sulfonyl compounds are employed in the reaction.

The other reaction conditions such as pressure are well known and are not critical. The surprising factor of the present invention is that by reacting an organic sulfonyl halide or sulfonyl cyanide with cyanide ion, a corresponding organic sulfonate and corresponding organic thiocyanate are produced.

SPECIFIC EMBODIMENTS

Examples 1–4

To a 1 liter three-necked flask equipped with a condenser leading to a Dry Ice-acetone trap, 45.3 grams of p-toluenesulfonyl chloride (0.25 mole), 36.7 grams of sodium cyanide (0.75 mole) that had been dried in a vacuum over at 110° C. for 72 hours and 500 ml. of dry acetonitrile were added. The temperature of the reactor was raised to 70° C. and the reaction mixture was stirred for 20 hours at that temperature. The reaction mixture was then filtered to give a solid residue of 32.3 grams. The brown solid residue was extracted with methanol, the extract was treated with activated charcoal and the methanol was evaporated to give 21.3 grams of sodium p-toluene sulfonate, a 43% yield. The filtrate from the reaction mixture was concentrated and the residue which formed was extracted with benzene. The benzene was removed and the residue was distilled to give 6.4 grams of p-tolyl thiocyanate having a boiling point of 77° C. at 8 mm. of mercury, a yield of 17%. The structure of both products was checked by infrared spectroscopy. Mass spectral analysis of the contents of the cold trap showed the presence of cyanogen. The results of this experiment and the results of similar experiments. Examples 2-4, with p-toluenesulfonyl bromide, p-toluenesulfonyl fluoride and p-toluenesulfonyl cyanide are summarized in Table I.

TABLE I.—REACTIONS OF p-TOLUENESULFONYL COMPOUNDS, R—SO$_2$X WITH SODIUM CYANIDE IN THE PRESENCE OF ACETONITRILE

| Example number | X | Temp., °C. | Time, hr. | Percent yield | | Percent RSO$_2$X recovered |
|---|---|---|---|---|---|---|
| | | | | RSCN | RSO$_3$Na | |
| 1 | Cl | 70 | 20 | 17 | 43 | 0 |
| 2 | Br | 70 | 12 | 27 | 53 | 0 |
| 3 | F | 70 | 20 | 3 | 7 | 70 |
| 4 | CN | 25 | 12 | 31 | 61 | 0 |

Example 5

In the same manner as described in Example 1, p-toluenesulfonyl chloride was reacted with sodium cyanide and potassium cyanide in dimethylformamide at 25° C., in chlorobenzene at 110° C. and in o-dichlorobenzene at 175° C. In each case, results similar to those of the above examples were obtained.

In the same manner as described in the examples above, 1 mole of p-chlorobenzenesulfonyl chloride, hexanesulfonyl bromide, 3-chloro-1-butanesulfonyl cyanide or pyridinesulfonyl bromide may be reacted with about 3 moles of copper cyanide, sodium cyanide or potassium cyanide in a solvent such as acetonitrile at a temperature of 50° C. for 30 hours to produce the corresponding thiocyanates and sulfonates.

We claim:

1. A process for preparing organic thiocyanates comprising reacting the appropriate organic sulfonyl halide or sulfonyl cyanide containing up to 20 carbon atoms in the liquid phase with a readily dissociable cyanide salt under essentially anhydrous reaction conditions at a temperature of from 0° to 200° C.

2. The process of claim 1 wherein the sulfonyl compound is a benzenesulfonyl halide or cyanide having up to 10 carbon atoms.

3. The process of claim 2 wherein the sulfonyl compound is a p-alkylbenzenesulfonyl compound.

4. The process of claim 3 wherein the sulfonyl compound is a p-toluenesulfonyl halide or cyanide.

5. The process of claim 1 wherein the cyanide salt is an alkali metal cyanide salt.

6. The process of claim 1 wherein a stoichiometric excess of the cyanide salt is reacted.

7. The process of claim 6 wherein a 30 to 100% excess of cyanide is reacted.

References Cited

UNITED STATES PATENTS 2,174,856  10/1939  Johnson _____ 260—503
3,184,482   5/1965  Steiger _____ 260—454

OTHER REFERENCES

Van Leusen et al., "Sulphonyl Cyanide, a new functional group," Chem. Conv. 1968 pp. 440–41 (1968).

LEWIS GOTTS, Primary Examiner

G. HOLLRAH, Assistant Examiner

U.S. Cl. X.R.

260—294.8 R, 294.8 F, 329 S, 347.2, 505 R, 513 H; 23—151